(12) United States Patent
Suyama et al.

(10) Patent No.: US 7,584,990 B2
(45) Date of Patent: Sep. 8, 2009

(54) PASSENGER CONSTRAINING APPARATUS

(75) Inventors: Yoji Suyama, Tokyo (JP); Akira Kokeguchi, Tokyo (JP)

(73) Assignee: Takata Corporation, Tokyo (JP)

( * ) Notice: Subject to any disclaimer, the term of this patent is extended or adjusted under 35 U.S.C. 154(b) by 369 days.

(21) Appl. No.: 11/526,010

(22) Filed: Sep. 25, 2006

(65) Prior Publication Data
US 2007/0069510 A1    Mar. 29, 2007

(30) Foreign Application Priority Data
Sep. 26, 2005  (JP) ............................. 2005-278172
Feb. 27, 2006  (JP) ............................. 2006-050537

(51) Int. Cl.
*B60R 21/18*   (2006.01)
*B60R 21/207*  (2006.01)

(52) U.S. Cl. ................... 280/733; 280/730.2; 280/808; 297/473; 297/483

(58) Field of Classification Search ................ 280/733, 280/730.2, 728.2, 801.2, 808; 297/473, 483
See application file for complete search history.

(56) References Cited

U.S. PATENT DOCUMENTS

| | | | | |
|---|---|---|---|---|
| 3,836,168 A | * | 9/1974 | Nonaka et al. ............... 280/733 |
| 3,844,001 A | * | 10/1974 | Holmberg .................. 24/598.1 |
| 3,929,205 A | * | 12/1975 | Takada et al. ............... 280/733 |
| 5,393,091 A | | 2/1995 | Tanaka et al. |
| 5,431,448 A | | 7/1995 | Ball et al. |
| 5,829,841 A | * | 11/1998 | Pywell et al. ................ 297/471 |
| 5,839,753 A | * | 11/1998 | Yaniv et al. ................. 280/733 |
| 5,851,055 A | * | 12/1998 | Lewis ......................... 297/483 |
| 5,897,169 A | * | 4/1999 | Larsen et al. ............... 297/483 |
| 6,145,881 A | | 11/2000 | Miller et al. |
| 6,336,656 B1 | * | 1/2002 | Romeo ....................... 280/733 |
| 6,547,273 B2 | * | 4/2003 | Grace et al. ................. 280/733 |
| 6,705,645 B2 | * | 3/2004 | Motozawa et al. .......... 280/806 |
| 7,004,547 B1 | * | 2/2006 | Cheng ........................ 297/483 |
| 7,226,131 B2 | * | 6/2007 | Meneses et al. ............. 297/480 |
| 2007/0069508 A1 | * | 3/2007 | Kokeguchi et al. .......... 280/733 |

FOREIGN PATENT DOCUMENTS

| | | |
|---|---|---|
| DE | 199 50 951 A1 | 4/2001 |
| EP | 0 573 741 A | 12/1993 |
| JP | 2001-239906 | 9/2001 |
| JP | 2003-312439 | 11/2003 |
| WO | WO 00/21798 | 4/2000 |

* cited by examiner

*Primary Examiner*—Paul N. Dickson
*Assistant Examiner*—George D. Spisich
(74) *Attorney, Agent, or Firm*—Foley & Lardner LLP

(57) ABSTRACT

The disclosed passenger constraining apparatus includes an inflated inflatable portion which may be placed at a high position around a lateral side of a passenger's head without using a high-capacity inflator. The passenger constraining device may include a passenger constraining belt comprising an inflatable portion configured such that at least a portion of the inflatable portion is arranged near the lateral side of the head of the passenger and a push-up device for pushing up the inflatable portion.

13 Claims, 13 Drawing Sheets

PASSENGER CONSTRAINING APPARATUS

BACKGROUND

The present application relates to a passenger constraining apparatus for constraining a passenger seated on a vehicle seat with an inflatable belt.

A passenger constraining apparatus for constraining a seated passenger with an inflatable belt is known (for example, Japanese Unexamined Patent Application Publication No. 2003-312439 (the '439 publication), which is incorporated by reference herein). The apparatus has a shoulder anchor arranged on a rear side of the seat with respect to the vehicle and a passenger constraining belt to be passed through the shoulder anchor and pulled around a front side of the passenger. At least a portion of the passenger constraining belt which is arranged around a lateral side of the passenger's head is an inflatable portion.

The passenger constraining apparatus of the '439 publication described above includes a shoulder anchor mounted to an upper portion of a pillar member placed obliquely on the rear side of the vehicle seat so that a passenger constraining belt passed through the shoulder anchor is pulled around the front side of the passenger seated on the seat.

The passenger constraining belt includes a shoulder belt section and a lap belt section. The shoulder belt section is drawn obliquely from the shoulder anchor near the lateral side of the passenger's head and around the front side of the upper body of the passenger to a portion near the lower end and on the other side of the vehicle seat. The lap belt section is continued from the lower end of the shoulder belt section and drawn along a lateral direction so as to cover the abdominal portion of the passenger. In the '439 publication, the shoulder belt section is configured with an inflatable bag-shaped belt. The bag-shaped belt is arranged so that an upper end side thereof is positioned around the lateral side of the passenger's head. In the same publication, the lap belt section is also configured with the inflatable bag-shaped belt.

When the vehicle collides, falls on its side, or the like, the shoulder belt section and the lap belt section are inflated to constrain the passenger. At this time, the upper end side of the shoulder belt section around the lateral side of the passenger's head, i.e., between the passenger's head and a side surface of a cabin, is inflated. Accordingly, the passenger's head is prevented from directly hitting onto the side surface of the cabin or the like.

The inflatable portion of the above-described shoulder belt section or the like is preferably inflated to a position as high as possible and arranged around the lateral side of the center of gravity of the passenger's head or in the vicinity thereof. In order to do so, it is conceivable that a large capacity inflatable portion is employed. However, in that case, a high-output inflator is required

SUMMARY

According to a disclosed embodiment a passenger constraining apparatus is provided in which an inflatable portion can be arranged at a high position around the lateral side of the passenger's head without using a high-output inflator.

According to a disclosed embodiment, a passenger constraining apparatus is disclosed which can include a passenger constraining belt to be pulled around a front side of a passenger and around a lateral side of the passenger's head and a push-up device. The passenger constraining belt may have an inflatable portion with at least a portion arranged around the lateral side of the passenger's head. The push-up device can be provided on an upper portion of a seatback for pushing up the inflatable portion.

The passenger constraining apparatus may be characterized in that the push-up device may include a belt guide provided on an upper surface side of the seatback and a raising device for raising the belt guide.

The passenger constraining apparatus may also be characterized in that the raising device can raise the belt guide by an inflating pressure of the inflatable portion.

The passenger constraining apparatus can also be characterized in that the push-up device may be arranged on the upper surface side of the seatback and may include a belt guide, a guiding member, a rotating member, a lever section, and an abutment member. The belt guide may have the inflatable portion pass through the guide on an upper side. The guiding member may extend downward from the belt guide and can be supported so as to be capable of rising with respect to the seatback. A rotating member can be arranged on an upper side of the inflatable portion which is drawn over the belt guide. The rotating member may extend in a direction intersecting with the longitudinal direction of the inflatable portion and can be rotatably attached to one end side of the belt guide in the extending direction so that the other end side of the belt guide in the extending direction can rotate upward. The lever section may project from the one end side of the rotating member in the extending direction and may move downward when the other end side of the rotating member is rotated upward. The abutment member can be provided on the upper portion of the seatback so that the lever section which is rotated downward comes into abutment therewith. When the lever section is rotated downward, the lever section can come into abutment with the abutment member and, subsequently, when the lever section is further rotated, the belt guide is pushed upward.

The passenger constraining apparatus can also include a downward movement preventing mechanism which prevents the downward movement of the pushed-up belt guide.

The passenger constraining apparatus may be characterized in that the raising device may include an urging mechanism which urges the belt guide upward, a belt guide locking mechanism which prevents the belt guide from rising against an urging force applied by the urging mechanism, and a lock releasing mechanism which releases the locking action of the belt guide locking mechanism so as to cause the belt guide to start rising.

The passenger constraining apparatus can further be characterized in that the lock releasing mechanism can be configured in such a manner that the passenger constraining belt generates a tensile force by the inflation of the inflatable portion, and the tensile force presses and moves the belt guide downward, thereby moving the belt guide locking mechanism into a lock releasing position.

The passenger constraining apparatus may include an airbag apparatus provided in a vehicle seat, and can be characterized in that the lock releasing mechanism causes an airbag to pull on the belt guide locking mechanism so as to move the belt guide locking mechanism into a lock releasing position when the airbag of the airbag apparatus is inflated.

The passenger constraining apparatus may include an airbag apparatus provided in a vehicle seat, and can be characterized in that when an inflator in the airbag apparatus is activated to generate gas, the lock releasing mechanism pulls on the belt guide locking mechanism using the gas pressure from the inflator to move the belt guide locking mechanism into a lock releasing position.

In the passenger constraining apparatus according to an embodiment of the present invention, because the push-up device for pushing up the inflatable portion of the passenger constraining belt is provided on the upper portion of the seatback of the seat, the inflated inflatable portion can be placed at a high position around the lateral side of the passenger's head by pushing up the inflatable portion with the push-up device without using a high-output inflator.

When a configuration is provided such that the belt guide is provided on the upper surface side of the seatback, the passenger constraining belt is passed through the belt guide, and the belt guide is raised by the raising device, thereby pushing up the inflatable portion, positional displacement of the passenger constraining belt is prevented. Hence, the inflatable portion can be placed reliably at a predetermined position.

By configuring the raising device to raise the belt guide by the inflating pressure of the inflatable portion, a simplification of the configuration or a reduction of the manufacturing cost can be achieved without the necessity of separately providing a power source for the raising device.

In a disclosed embodiment, the inflatable portion drawn between the belt guide and the rotating member is inflated. Then, the rotating member is pushed upward by the inflating pressure of the inflatable portion and is rotated upward, causing the lever section to be rotated downward correspondingly. The lever section rotated downward can come into abutment with the abutment member. By further rotating the lever section downward in association with the process of inflation of the inflatable portion, the belt guide can be raised. Consequently, the inflatable portion may be pushed upward by the belt guide and may be placed at a high position around the lateral side of the passenger's head.

By preventing the downward movement of the raised belt guide, the inflated passenger constraining belt can be maintained at a high position.

In the passenger constraining apparatus according to one embodiment, when the locking action by the belt guide locking mechanism is released, the belt guide is pushed upward by the urging mechanism.

In the passenger constraining according to another embodiment, when the inflatable portion is inflated, a tensile force is generated at the passenger constraining belt by the shortening of the inflatable portion. This tensile force pushes the belt guide downward. When the belt guide is pushed downward in this manner, the belt guide locking mechanism is moved into the lock releasing position. Accordingly, the belt guide is pushed upward by being urged by the urging mechanism.

According to another embodiment, when the airbag such as a side airbag is inflated, the airbag pulls the belt guide locking mechanism, whereby the belt guide locking mechanism moves into the lock releasing position.

According to another embodiment, when the inflator of the side airbag apparatus or the like is activated to generate gas, the belt guide locking mechanism is pulled by the gas pressure, whereby the belt guide locking mechanism is moved into the lock releasing position.

It is to be understood that both the foregoing general description and the following detailed description are exemplary and explanatory only, and are not restrictive of the invention as claimed.

BRIEF DESCRIPTION OF THE DRAWINGS

The features, aspects, and advantages of the present invention will become apparent from the following description, appended claims, and the accompanying exemplary embodiments shown in the drawings, which are briefly described below.

SUMMARY

Figure 1:
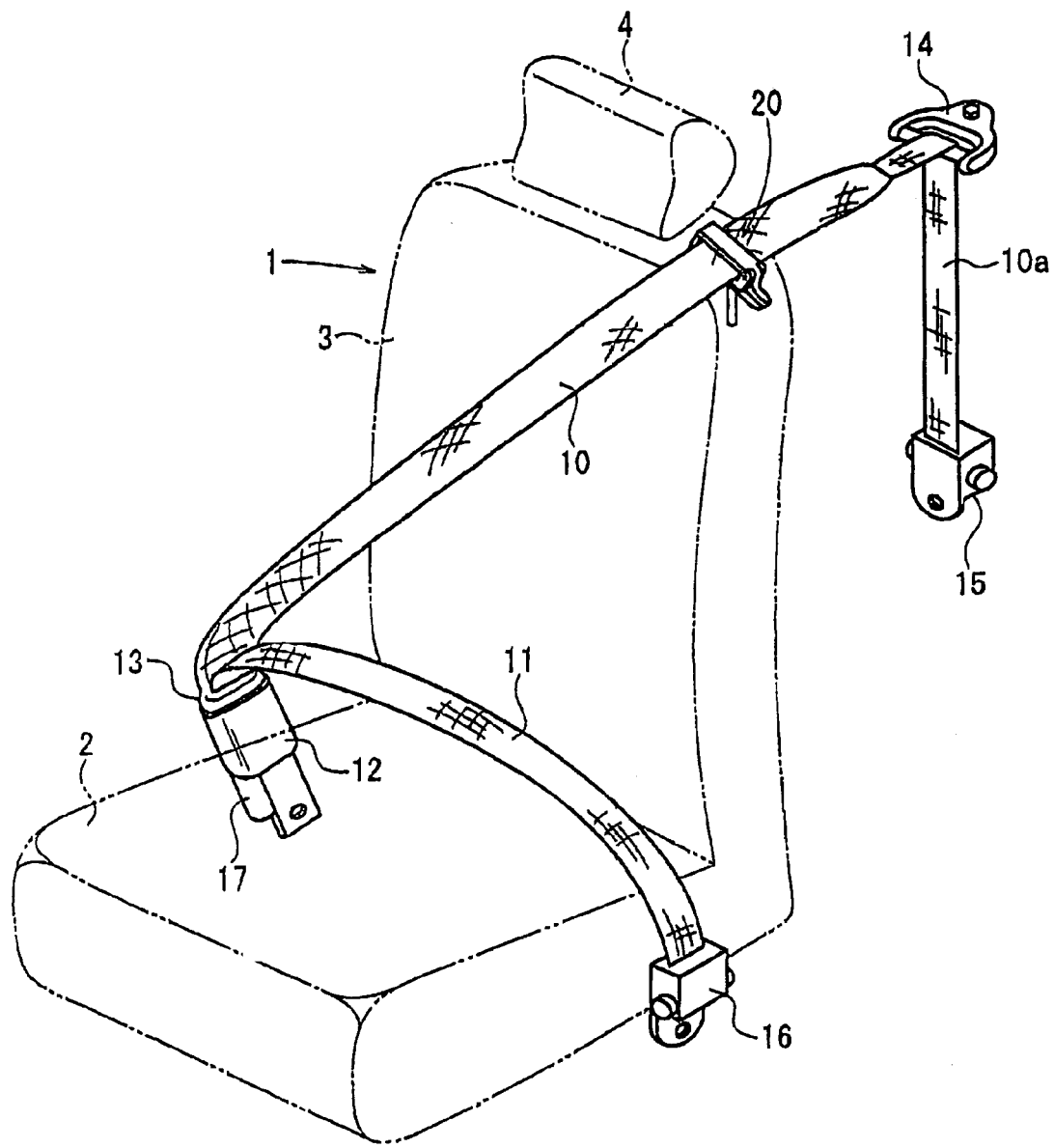
FIG. 1 is a perspective view of a passenger constraining apparatus.

Referring now to the drawings, an embodiment of the present invention will be described below.

Figure 2:
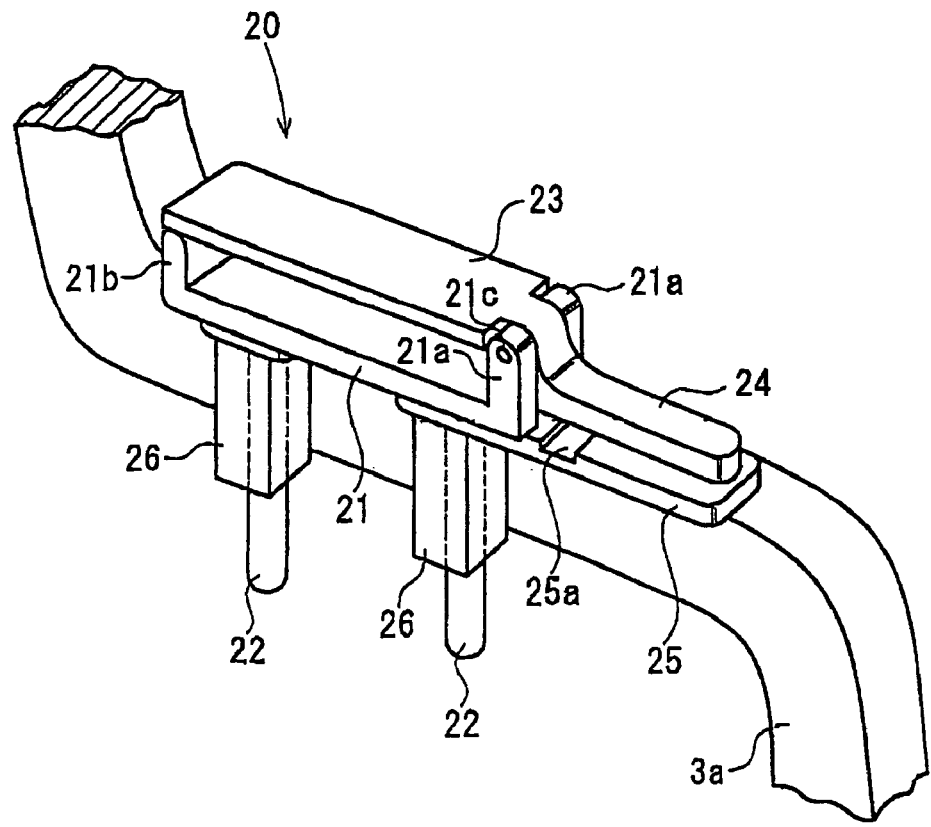
FIG. 2 is a perspective view of the push-up device in the passenger constraining apparatus of FIG. 1.
Figure 3:
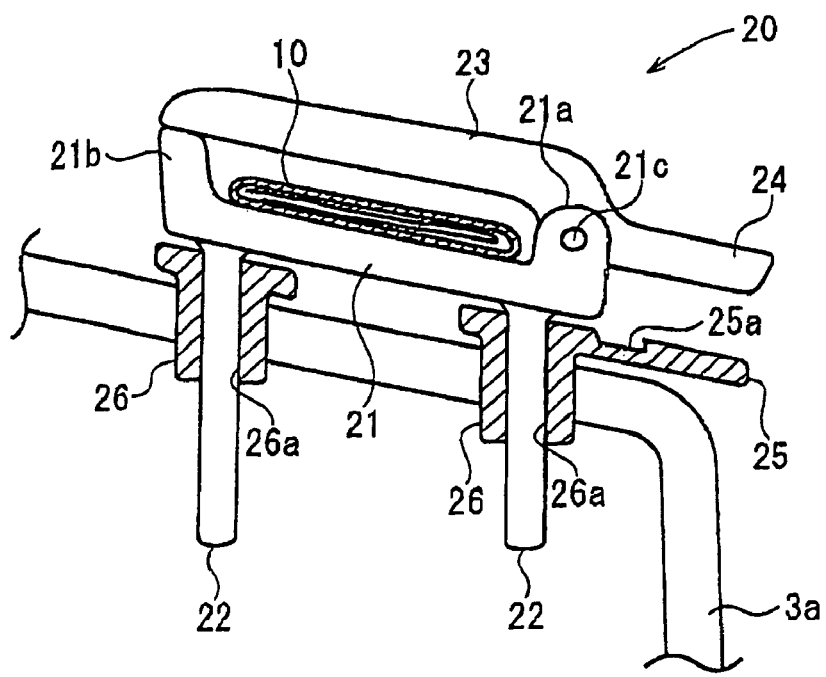
FIG. 3 is a cross-sectional view of the push-up device of the passenger constraining apparatus of FIG. 1.
Figure 4A:
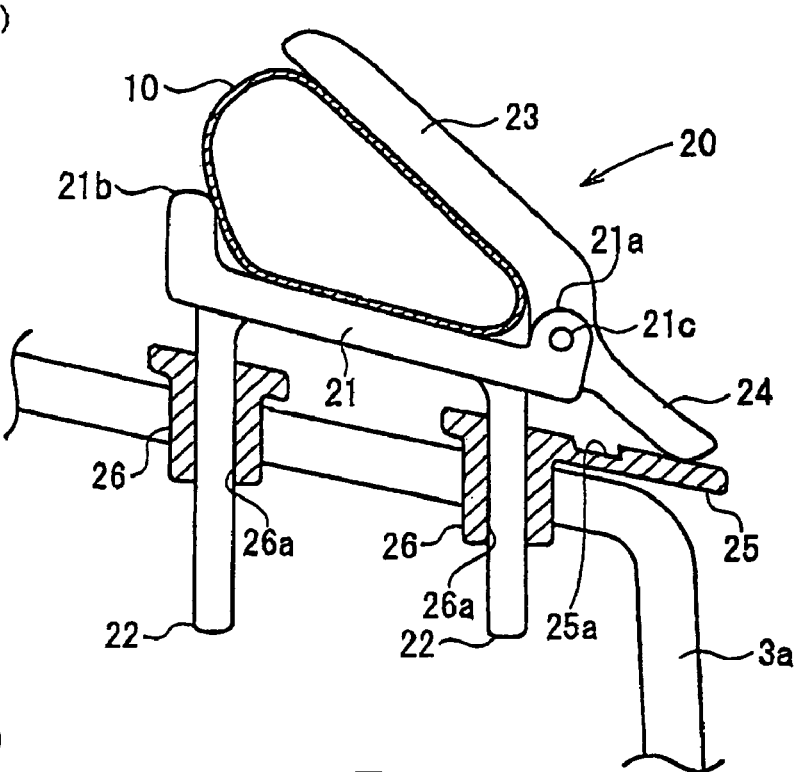
FIGS. 4(a) and 4(b) are cross-sectional views of the push-up device showing a state in which the inflatable portion of the passenger constraining apparatus of FIG. 1 is being pushed up.
Figure 4B:
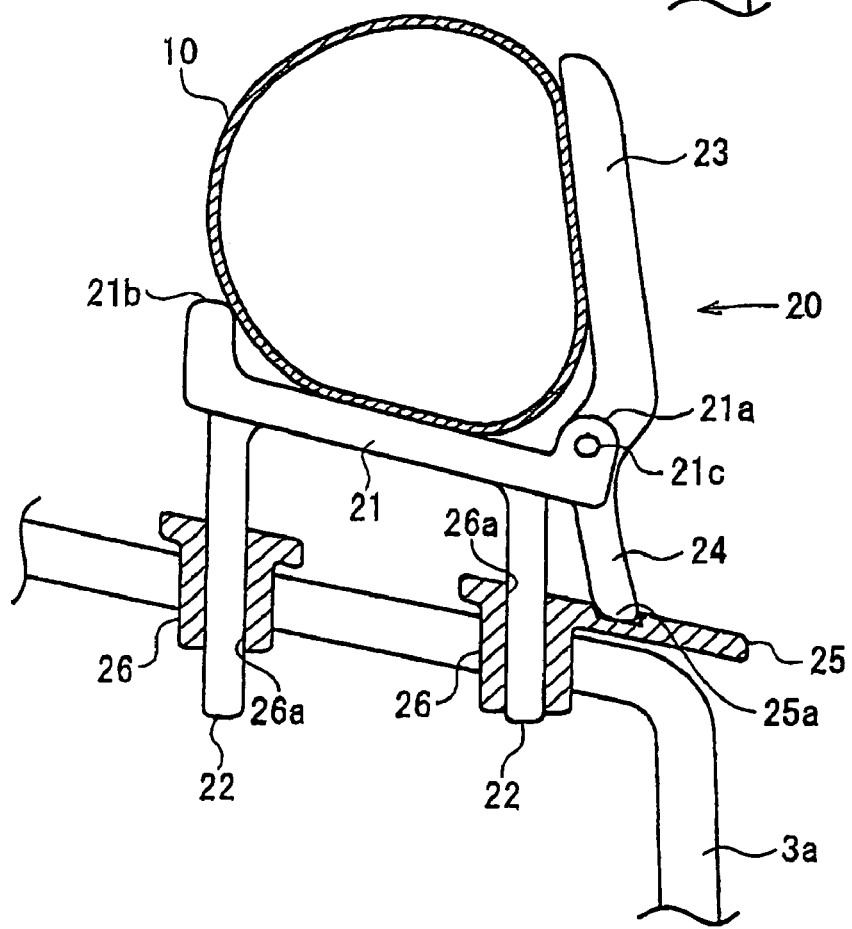
Figure 5:
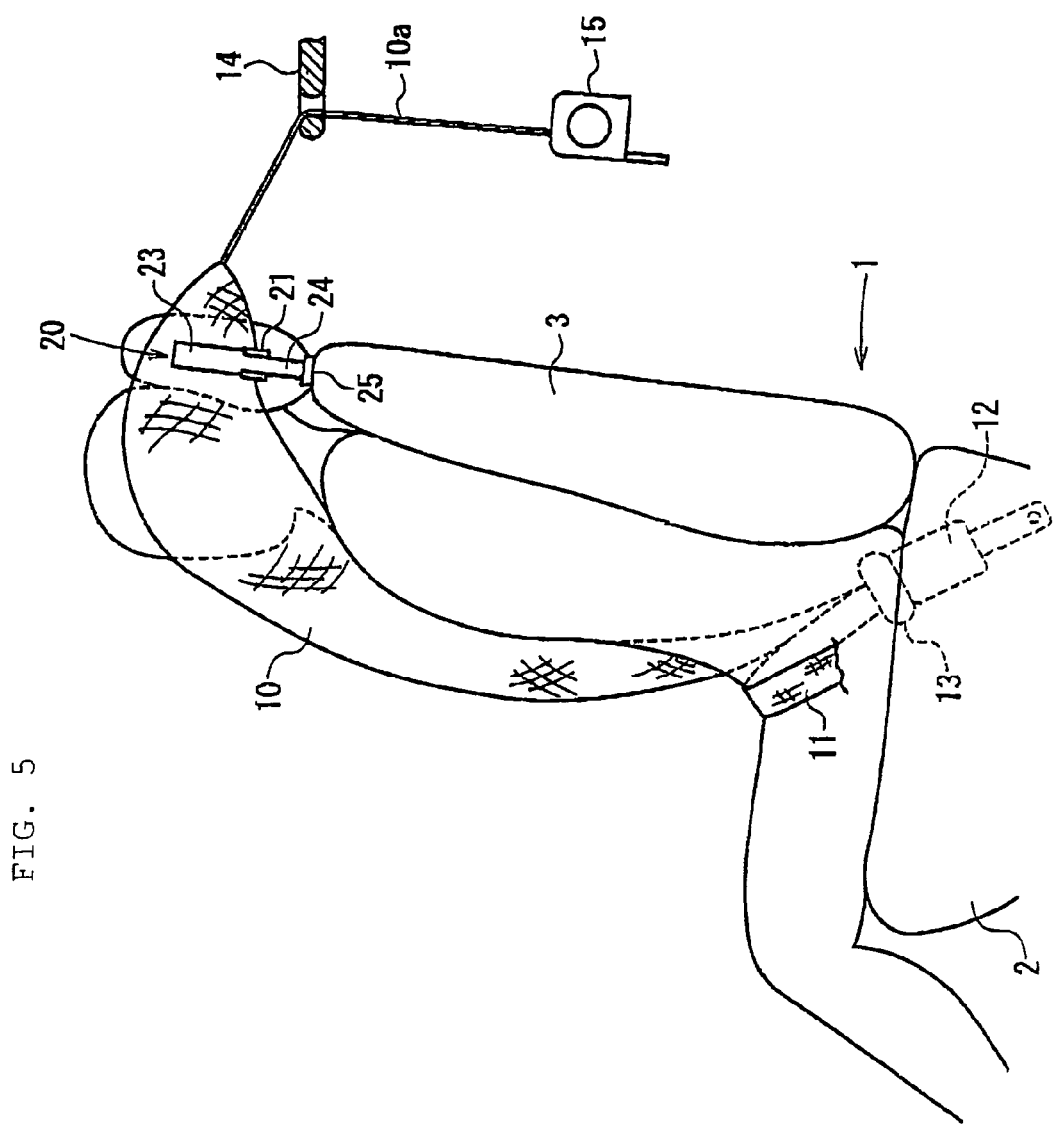
FIG. 5 is a side view of the passenger constraining apparatus of FIG. 1.

FIG. 1 is a perspective view of a passenger constraining apparatus. FIG. 2 is a perspective view of a shoulder belt section push-up device in the passenger constraining apparatus. FIG. 3 is a cross-sectional view of the push-up device. FIGS. 4(a) and 4(b) are cross-sectional views of the push-up device in the course of pushing up the shoulder belt section and at the completion of pushing up the should belt section, respectively. FIG. 5 is a side view of the passenger constraining apparatus in a state in which the shoulder belt section is inflated.

As shown in FIG. 1, a vehicle seat 1 includes a seat cushion 2 on which a passenger is seated, a seatback 3 which constitutes a back of the seat, and a head rest 4 provided on top of the seatback 3. The seat cushion 2 is formed by mounting a cushion material of urethane or the like on a base frame (not shown) installed on a floor surface of the vehicle. The seatback 3 is formed by mounting a cushion material, such as urethane or the like, on a seatback frame 3a (FIG. 2 to FIG. 4) extending upright from a rear end of the base frame via a reclining device (not shown).

In this embodiment, the passenger constraining apparatus can include a shoulder belt section 10, a webbing 10a, a lap belt section 11, a buckle device 12, a tongue 13, a shoulder anchor 14, a push-up device 20, and so on. The shoulder belt section 10 can be an inflatable portion which passes around a lateral side of the passenger's head seated on the seat 1 and can be drawn obliquely along a front side of an upper body of the passenger (for example, from the upper left to the lower right as in the embodiment shown in FIG. 1). The webbing 10a is connected to the shoulder belt section 10. The lap belt section 11 is drawn in the lateral direction on an upper side of a lumbar part of the passenger. The buckle device 12 is installed adjacently on a lateral side of the seat 1 (for example, the right side in this embodiment). The tongue 13 is inserted into and engaged with the buckle device 12 when attaching the belt. The shoulder anchor 14 guides the webbing 10a. The push-up device 20 pushes up the shoulder belt section 10 provided on an upper portion of the seatback 3 (for example, the left shoulder portion of the seatback 3).

In the embodiment shown in FIG. 1, the shoulder belt section 10, the webbing 10a and the lap belt section 11 constitute a passenger constraining belt, and the shoulder belt section 10 forms the inflatable portion. The shoulder belt section 10 is inflated from around the lateral side of the head to the front side of the upper body of the passenger.

The shoulder belt section 10 is formed by folding a wide belt-shaped bag into a narrow band shape and covering the belt-shaped bag with a cover. Thus, the shoulder belt section 10 is held in a band shape in the normal state. A distal end of the webbing 10a is connected to an upper end side of the shoulder belt section 10 by sewing or the like, and the tongue 13 is joined to a lower end side of the shoulder belt section.

The webbing 10a is formed of a normal belt similar to a general non-inflatable seatbelt in the related art, and is slidably guided and passed through the shoulder anchor 14. An end of the webbing 10a is retractably joined to a seatbelt retractor (ELR) 15 with an emergency locking mechanism installed on the vehicle.

The lap belt section 11 can also be formed of a non-inflatable normal belt, and is retractably joined at one end with the tongue 13 and at the other end with a seatbelt retractor (ELR) 16 installed on the seat 1 on the opposite side from the buckle device 12.

An inflator 17, which is activated in an emergency state such as a vehicle collision to generate high-pressure gas, is connected to the buckle device 12. A passage (not shown) for guiding the gas from the inflator 17 into the shoulder belt section 10 can be provided on the tongue 13.

The push-up device 20 may be arranged on an upper surface side of the left shoulder portion on the seatback 3. The push-up device can include a belt guide 21, a guiding member 22, a rotating member 23, a lever section 24, and an abutment member 25. The shoulder belt section 10 can be drawn through belt guide 21. The guiding member 22 may extend downward from the belt guide 21 and is supported on the seatback 3 so as to be capable of rising with respect to the seatback 3. The rotating member 23 is arranged on the belt guide 21 on an upper side of the shoulder belt section 10, is extended in an intersecting direction (known as the extending direction) with the longitudinal direction of the shoulder belt section 10, and is rotatably attached to the belt guide 21 at one side (the proximal end side) in the extending direction so that the other side in the extending direction (the distal end side) can rotate upward. The lever section 24 projects from the proximal end side of the rotating member 23 in the extending direction of the rotating member 23 so as to rotate downward when the distal end side of the rotating member 23 rotates upward. The abutment member 25 is provided on the upper surface of the left shoulder portion of the seatback 3 and abuts the lever section 24 when it rotates downward.

In this embodiment, the belt guide 21 can have a rectangular plate shape extending in the lateral direction along an upper surface of the left shoulder portion of the seatback 3. The belt guide 21 may be provided with a pair of holding strips 21a, 21a extending upright for rotatably holding the proximal end side of the rotating member 23 on one end side in the longitudinal direction (i.e., the far side from the head rest 4), and a supporting strip 21b extending upright for supporting the distal end side of the rotating member 23 on the other end side (i.e., the head rest 4 side). The shoulder belt section 10 can be drawn from a rear side to a front side of the seatback 3 so as to pass between the holding strip 21a and the supporting strip 21b.

The rotating member 23 can be arranged on an upper side of the belt guide 21 with the extending direction thereof directed in parallel with the longitudinal direction of the belt guide 21. An end of the rotating member on the side far from the head rest 4 can be rotatably held by the holding strips 21a, 21a via an axis of rotation 21c. As shown in FIG. 2 and FIG. 3, when the shoulder belt section 10 is not inflated, the distal end side of the rotating member 23 can rest on the supporting strip 21b, and the belt guide 21 and the rotating member 23 constitute a frame-shaped belt guide which is closed over the entire circumference of the shoulder belt section.

The lever section 24 may extend from the proximal end portion of the rotating member 23 in the direction away from the head rest 4 along the upper surface of the seatback 3 in a state in which the distal end side of the rotating member 23 is moved downward and touches the supporting strip 21b.

The guiding members 22 can have a rod shape or a bar shape and can extend downward from a lower surface on one half side and the other half side in the longitudinal direction of the belt guide 21, respectively.

The holding members 26, 26 for holding the respective guiding members 22, 22 so as to be capable of rising may be provided on the left shoulder portion of the seatback 3. Each holding member 26 can be formed into a substantially cylindrical shape having an inner hole 26a, and can be secured to the frame 3a passing through the left shoulder portion of the seatback 3 with the axial center line of the inner hole 26a oriented in the vertical direction. An upper end side of the inner hole 26a of each holding member 26 can have an opening on the upper surface of the left shoulder portion of the seatback 3. The belt guide 21 may be mounted to the seatback 3 by inserting the guiding members 22 into the inner holes 26a of the holding members 26 so as to be capable of rising.

The upper end sides of the holding members 26 can be slightly projected from the upper surface of the seatback 3, and flanges can be radially extended from the upper end sides of the respective holding members 26 along the upper surface of the seatback 3.

The abutment member 25 may be formed by extending the flange of the holding member 26 on the side far from the head rest 4 in the direction away from the head rest 4. This abutment member 25 is below the lever section 24 and faces it.

A stopper groove 25a may be formed on an upper surface of the abutment member 25 for engagement with the distal end side of the lever section 24 when the lever section 24 is rotated downward. When the lever section 24 abuts the abutment member 25 and is then further rotated, the belt guide 21 is pressed upward to a predetermined height. With the engagement of the distal end side of the lever section 24 with the stopper groove 25a, the lever section 24 is prevented from rotating in the opposite direction, that is, a downward movement of the belt guide 21 is prevented.

In the passenger constraining apparatus in this embodiment, the passenger constraining belt can be used in the same manner as the normal seatbelt. When the passenger constraining belt is attached, for example, the belt guide 21 of the push-up device 20 and the rotating member 23 function as a belt guide loop. When the vehicle collides or falls on its side and the inflator 17 is activated, gas is introduced into the shoulder belt section 10, and as shown in FIGS. 4 and 5 the shoulder belt section 10 is inflated and increases in thickness.

In this case, as shown in FIGS. 4(*a*) to (*b*), the rotating member 23 can be pushed and rotated upward by the inflating pressure of the shoulder belt section 10 that passes between the belt guide 21 and the rotating member 23. Accordingly, the lever section 24 rotates downward. The lever section 24 rotated downward comes into abutment with the abutment member 25. Then, in association with the continuing process of inflation of the shoulder belt section 10, the lever section 24 is further rotated, and hence the lever section 24 receives a reaction force from the abutment member 25 which raises the belt guide 21. Consequently, the shoulder belt section 10 is pushed upward by the belt guide 21. As shown in FIG. 5, the inflated shoulder belt section 10 is placed at a high position around the lateral side of the passenger's head.

When the lever section 24 is rotated downward by a predetermined angle, it can be fitted to the stopper groove 25*a*, and the rotation of the lever section 24 in the opposite direction is prevented. Accordingly, the downward movement of the inflated shoulder belt section 10 is also prevented.

In this manner, because the shoulder belt section 10 is pushed up by the push-up device 20 provided on the upper surface side of the seatback 3, the inflated shoulder belt section 10 can be placed at a high position around the lateral side of the passenger's head without using a high-output inflator.

Figure 6:
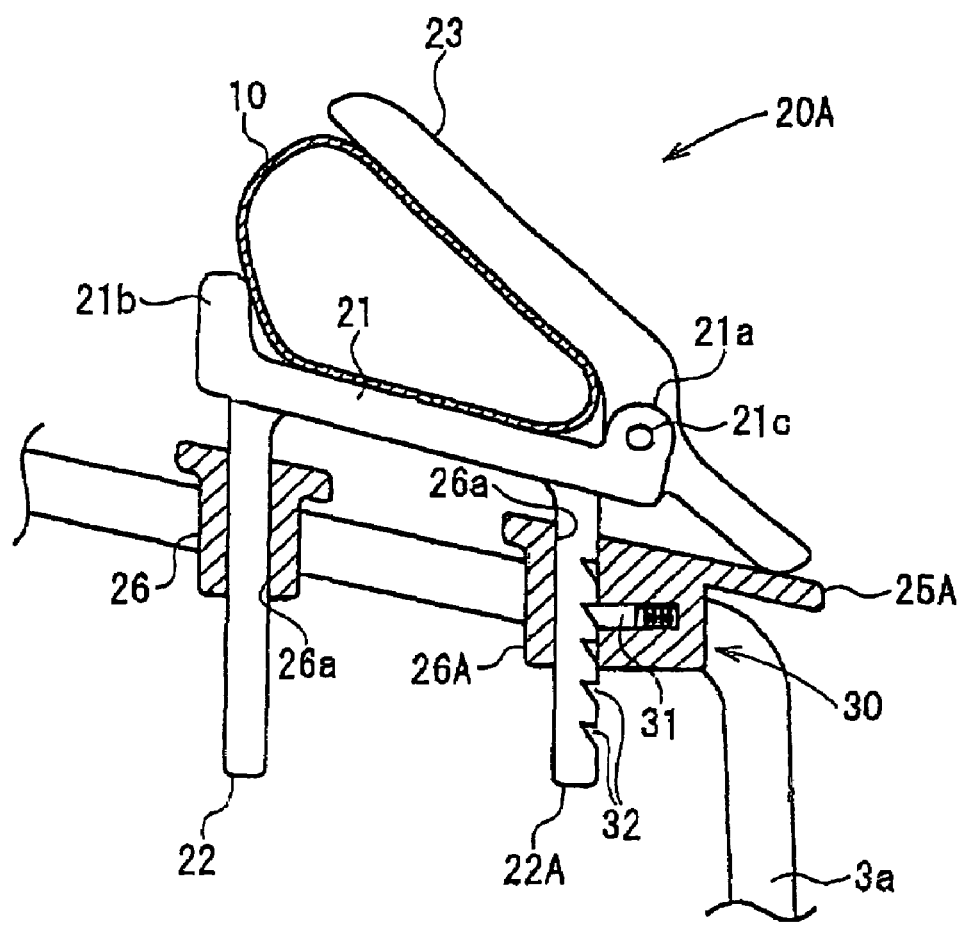
FIG. 6 is a cross-sectional view of the push-up device of the passenger constraining apparatus according to another embodiment.

Although the embodiment described above is configured so that the rotation of the lever section 24 in the opposite direction is prevented by the engagement of the lever section 24 with the stopper groove 25*a* on the upper surface of the abutment member 25 after being rotated by a predetermined angle (and hence the inflated shoulder belt section 10 and the belt guide 21 is maintained in the raised state), the mechanism to maintain the inflated shoulder belt section 10 in the raised state is not limited thereto. For example, it is also possible to configure the passenger constraining apparatus in such a manner that the inflated shoulder belt section 10 and the belt guide 21 can be maintained in the raised state by preventing the guiding member from retracting downward after raising. FIG. 6 is a cross-sectional view of a push-up device 20A configured in this manner which shows a state of the inflatable portion being pushed up by the push-up device 20A.

In the push-up device 20A in FIG. 6, a holding member 26A for holding one of the guiding members 22A of the belt guide 21 is provided with a ratchet mechanism 30 for preventing the raised guiding member 22A from retracting downward.

The ratchet mechanism 30 may be provided with a claw 31 projecting into the inner hole 26*a* of the holding member 26A by an urging force of a spring. Grooves 32 for engagement with the claw 31 can be formed on a side surface of the guiding member 22A. The plurality of grooves 32 may be provided on the guiding member 22A at different positions in the vertical direction of the guiding member 22A. The ratchet mechanism 30 can be configured so as to allow the claw 31 to retract from the groove 32 to allow the rising movement of the guiding member 22A when the guiding member 22A rises. The ratchet mechanism 30 can also be configured so as to prevent the claw 31 from retracting from the groove 32 and prevent the downward movement of the guiding member 22A when the guiding member 22A tries to move downward.

In the embodiment of FIG. 6, the stopper groove, which can engage with the lever section 24, is not provided on an upper surface of an abutment member 25A.

The other aspects of the push-up device 20A are the same as the push-up device 20 in FIGS. 1 to 5 described above. The same reference numerals in FIGS. 1 to 5 and FIG. 6 designate the same elements.

In the push-up device 20A of FIG. 6, once the guiding member 22A is raised, the ratchet mechanism 30 prevents the guiding member 22A from retracting downward. Therefore, the inflated shoulder belt section 10 and the belt guide 21 which rotatably supports the shoulder belt section 10 is maintained in a state of being raised to a high position around the lateral side of the passenger's head.

Referring now to FIGS. 7 to 12, other embodiments will be described.

Figure 7:
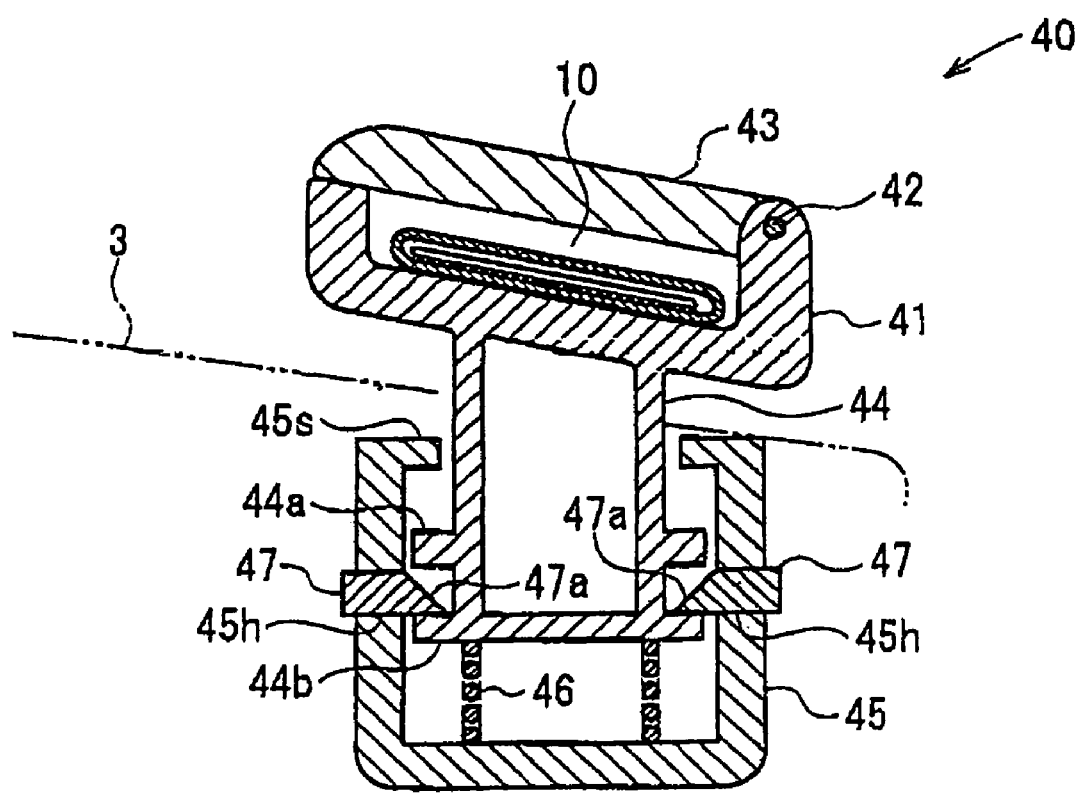
FIG. 7 is a cross-sectional view of the passenger constraining apparatus according to still another embodiment.
Figure 8:
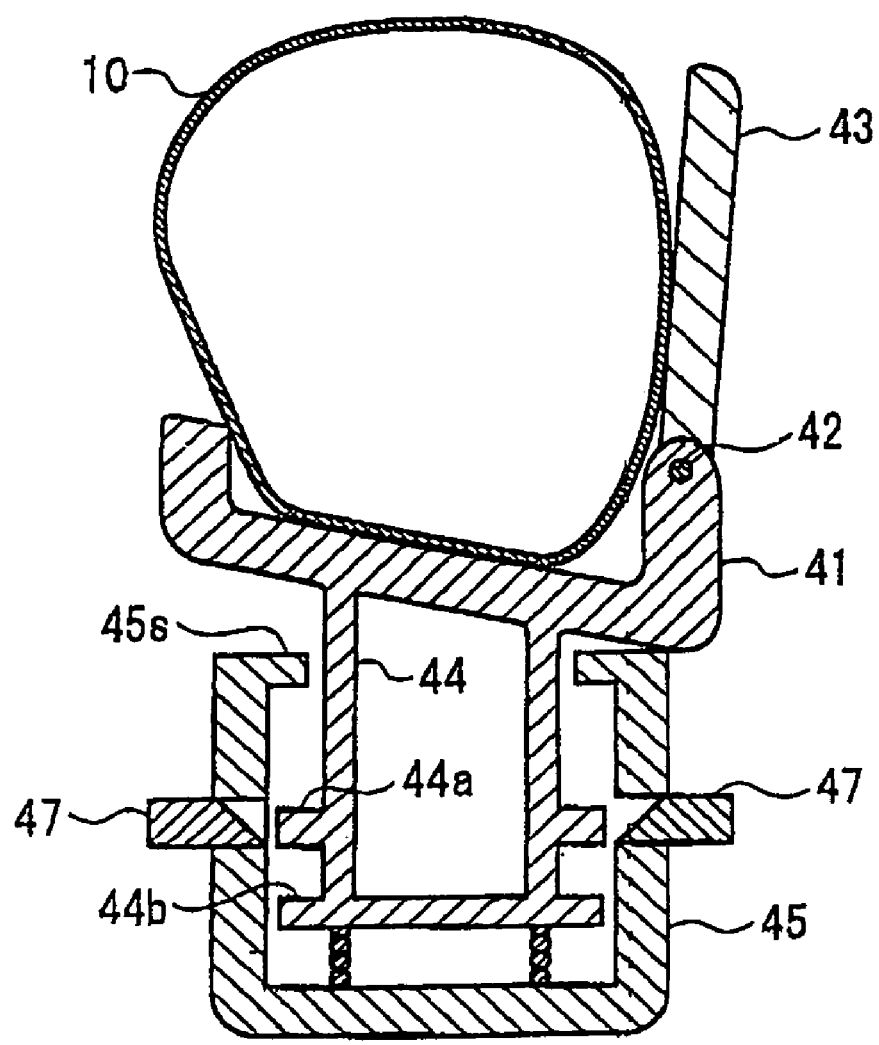
FIG. 8 is a cross-sectional view of the passenger constraining apparatus of FIG. 7 upon inflation of the inflation portion.
Figure 9:
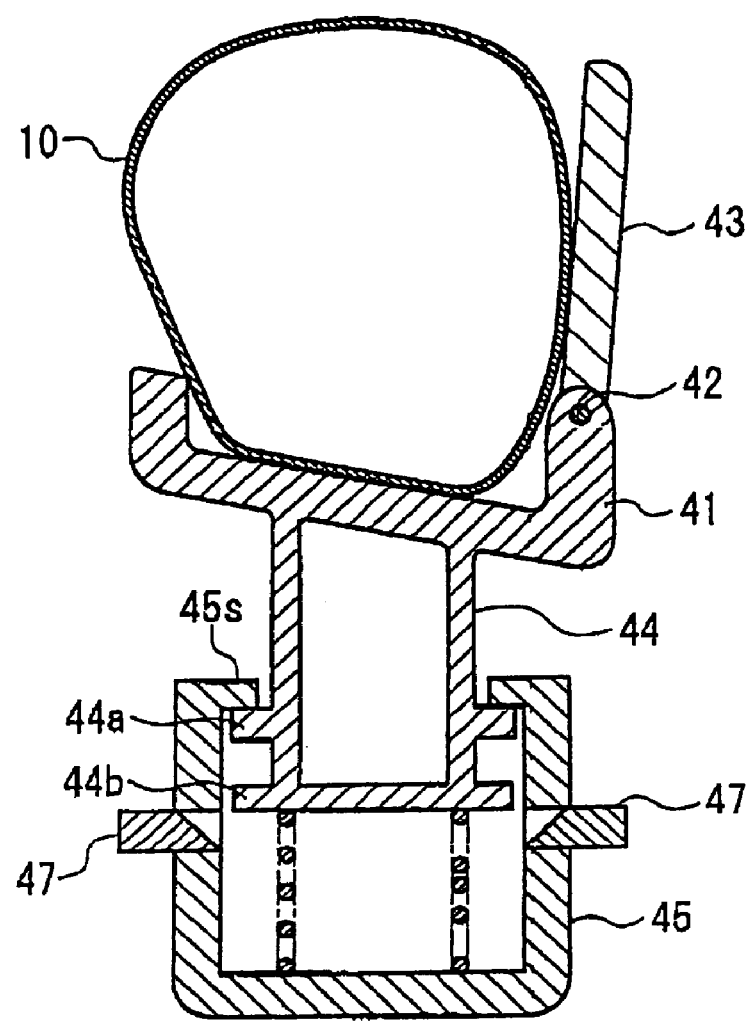
FIG. 9 is a cross-sectional view of the passenger constraining apparatus of FIG. 7 when the inflatable portion is pushed up.

FIG. 7 to FIG. 9 show the push-up device of the passenger constraining apparatus according to another embodiment. FIG. 7 shows a state in which the belt guide is in a stationary state; FIG. 8 shows a state in which the belt guide is pushed downward; and FIG. 9 shows a state in which the belt guide is pushed upward.

In the embodiment of FIGS. 7 to 9, the shoulder belt section 10 (as the inflatable portion) may be formed by folding a wide belt-shaped bag into a narrow band shape and covering the belt-shaped bag with a cover. The shoulder belt section 10 can be held in the band shape in the normal state in the same manner as the embodiment of FIG. 1.

As shown in FIG. 7, a push-up device 40 is arranged on the upper surface side of the left shoulder portion of the seatback 3, and includes a belt guide 41, a top cover 43, a guiding member 44, a holding member 45, lock pins 47, and the like. The belt guide 41 has the shoulder belt section 10 drawn through it. The top cover 43 is rotatably attached to the belt guide 41 via a supporting shaft 42. The guiding member 44 extends downward from the belt guide 41. The holding member 45 supports the guiding member 44 so as to be capable of rising. The coil spring 46 serves as an urging mechanism which urges the guiding member 44 upward. The lock pins 47 serve as a locking mechanism which prevents the guiding member 44 from rising.

The belt guide 41 may include an upwardly opening angular C-shape while the top cover 43 may be provided on an upper side of the shoulder belt section 10 so as to straddle the belt guide 41. The belt guide 43 can be pushed upward and rotated in the upright direction when the shoulder belt section 10 is inflated. It is also possible to urge the top cover 43 in the downward direction by a magnet or a spring.

The guiding member 44 may have a cylindrical shape, and is coaxially inserted into the holding member 45, which has a cylindrical shape with the direction of the axial center of the cylinder oriented in the vertical direction. The spring 46 is interposed between the bottom surface of the holding member 45 and the bottom surface of the guiding member 44 in a pressure-accumulated state.

A lower flange section 44*b* and an upper flange section 44*a* of an outwardly extending flange shape may be projected from two points: a lower end portion of the guiding member 44 and a position slightly upward from the lower end portion.

A plurality of supporting holes 45*h* for the lock pins 47 may be provided on a side periphery of the holding member 45 at intervals in the circumferential direction. The lock pins 47 are inserted into the supporting holes 45*h* so as to be capable of coming in and out. Distal end sides of the lock pins 47 can project from an inner peripheral surface of the holding member 45, and can be inserted between the upper flange section 44*a* and the lower flange section 44*b*. An upper surface of the distal end side of the lock pin 47 may be formed into an inclined surface 47a which is inclined downwardly. An outer peripheral end of the upper flange section 44a is placed above the inclined surface 47a. A lower surface of the lock pin 47 is substantially horizontal.

An inward flange-shaped stopper section 45s can be provided on an upper end of the holding member 45.

In the passenger constraining apparatus provided with this push-up device 40, when the shoulder belt section 10 is not inflated and is in the stationary state, the lock pins 47 are inserted between the upper flange section 44a and the lower flange section 44b as shown in FIG. 7. The lower flange section 44b is locked by the lock pins 47 to prevent the belt guide 41 from rising.

As shown in FIG. 8, when the shoulder belt section 10 starts inflation, the length of the shoulder belt section 10 in the longitudinal direction is reduced in association with the inflation thereof, and a tensile force is generated at the shoulder belt section 10. The belt guide 41 and the guiding member 44 are pushed downward by this tensile force.

The upper flange section 44a abuts against the inclined surface 47a of the lock pin 47 at the time of this downward movement, and the lock pin 47 moves outwardly of the holding member 45, so that the lock pins 47 cannot lock the lower flange section 44b any longer. Subsequently, the guiding member 44 and the belt guide 41 rise by the urging force of the spring 46. In this case, because the lock pins 47 are retracted, the lower flange section 44b does not come into abutment with the lock pins 47. Thus, the belt guide 41 is pushed upward until the upper flange section 44a comes into abutment with the stopper section 45s as shown in FIG. 9, and is maintained in this state. Accordingly, the inflated shoulder belt section 10 is maintained at a high position on the lateral side of the passenger's head.

Figure 10A:
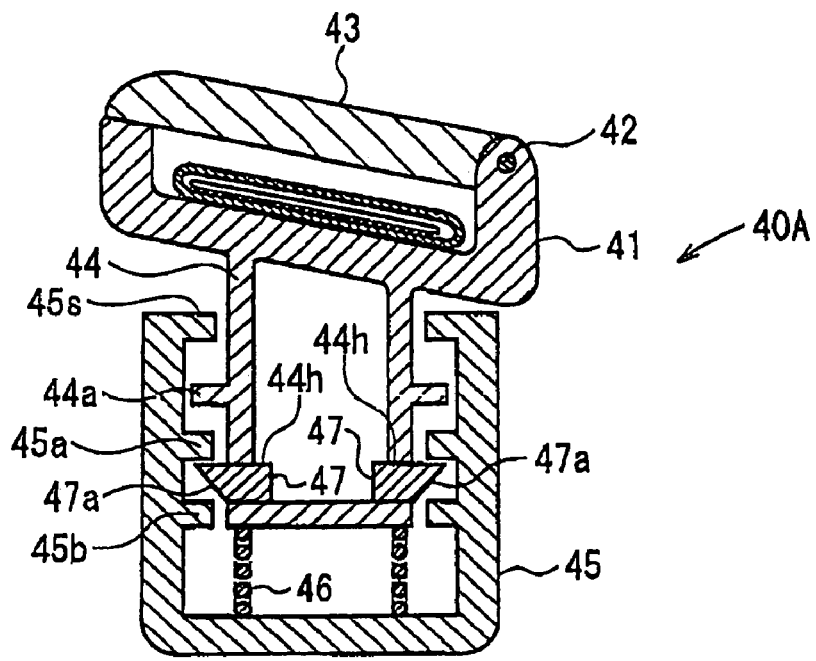
FIGS. 10(a) and 10(b) are cross-sectional views of the passenger constraining apparatus according to another embodiment.
Figure 10B:
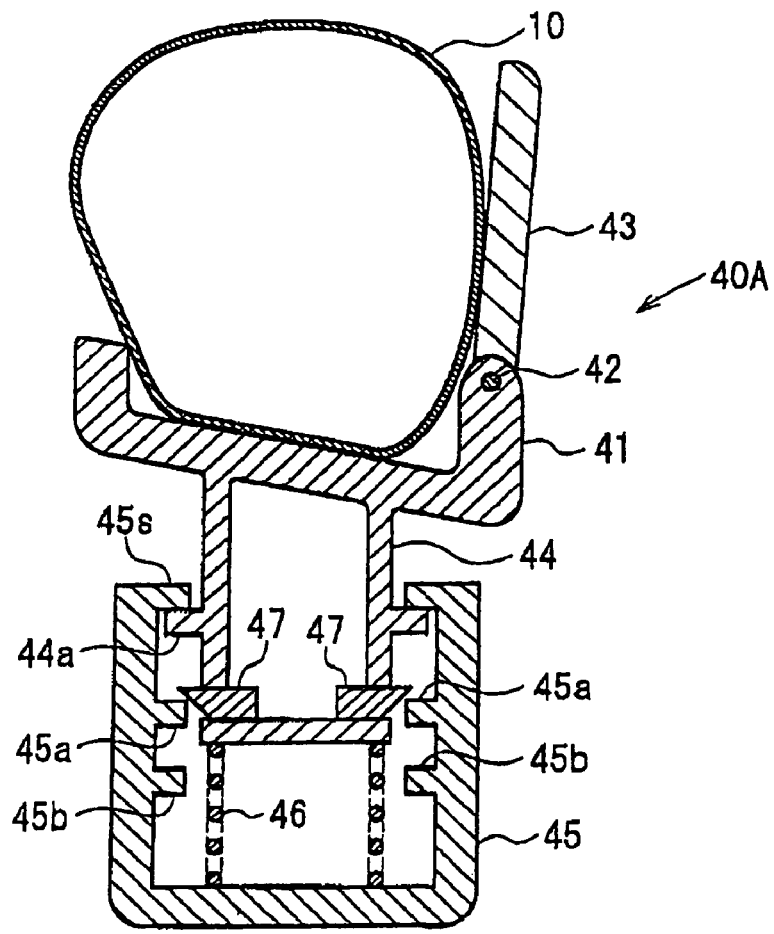

In the embodiment shown in FIGS. 7 and 8, the lock pins 47 are provided on the holding member 45. However, they may be provided on the guiding member 44. FIGS. 10(a) and 10(b) are vertical cross-sectional views taken along the same plane as in FIG. 7, which show a push-up device 40A according to an embodiment with such a structure.

In the embodiment of FIGS. 10(a) and 10(b), an upper flange section 45a and a lower flange section 45b are provided on the upper and lower stages on the inner peripheral surface of the holding member 45. The guiding member 44 is formed with supporting holes 44h for the lock pins 47. The lock pins 47 are slidably inserted into the supporting holes 44h, and the distal end sides thereof are inserted between the upper flange section 45a and the lower flange section 45b. A lower surface of the lock pin 47 on a distal end side is formed into an inclined surface 47a inclining upward. An inner peripheral end of the lower flange section 45b is placed below the inclined surface 47a. The lock pins 47 abut on the lower surface of the upper flange section 45a.

The guiding member 44 is provided with the upper flange section 44a, but is not provided with the lower flange section 44b (like that seen in FIGS. 7 to 9). The upper flange section 44a is provided above the upper flange section 45a of the holding member 45 by a predetermined distance. The rest of the configuration is the same as that of FIG. 7, and the same reference numerals in FIGS. 10(a) and 10(b) represent the same parts as the reference numerals in FIG. 7.

In the embodiment of FIG. 10(a), when the shoulder belt section 10 starts inflating, a tensile force is generated at the shoulder belt section 10, and the belt guide 41 and the guiding member 44 are pushed downward. In this case, the inclined surfaces 47a of the lock pins 47 come into abutment with the lower flange section 45b, and the lock pins 47 are retracted into the guiding member 44. Accordingly, the locking action of the lock pins 47 is released and, as shown in FIG. 10(b), the belt guide 41 and the guiding member 44 rise by the urging force of the spring 46 until the upper flange section 44a abuts on the stopper section 45s so that the shoulder belt section 10 is maintained at a high position.

Figure 11:
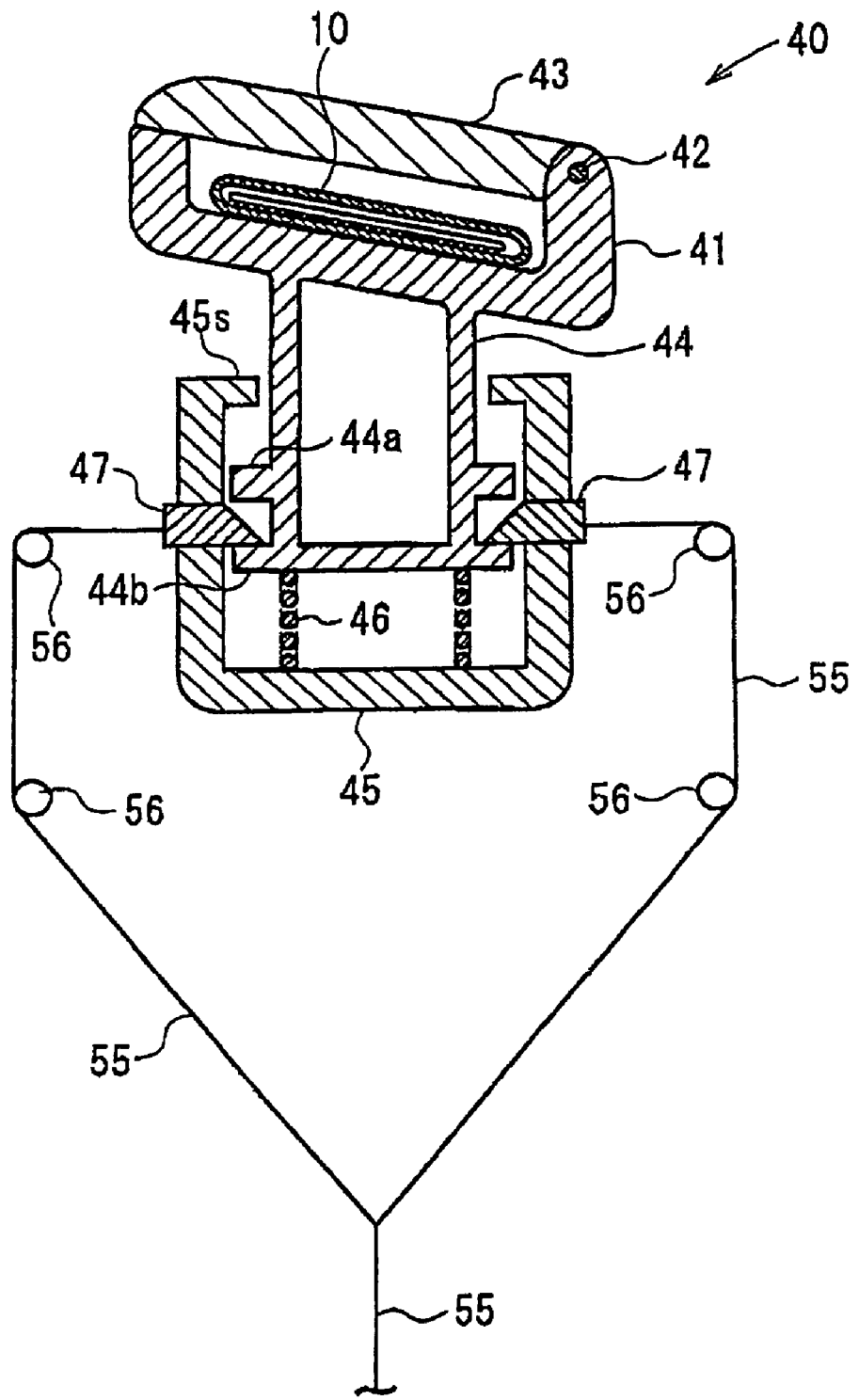
FIG. 11 is a cross-sectional view of the passenger constraining apparatus according to another embodiment.
Figure 12:
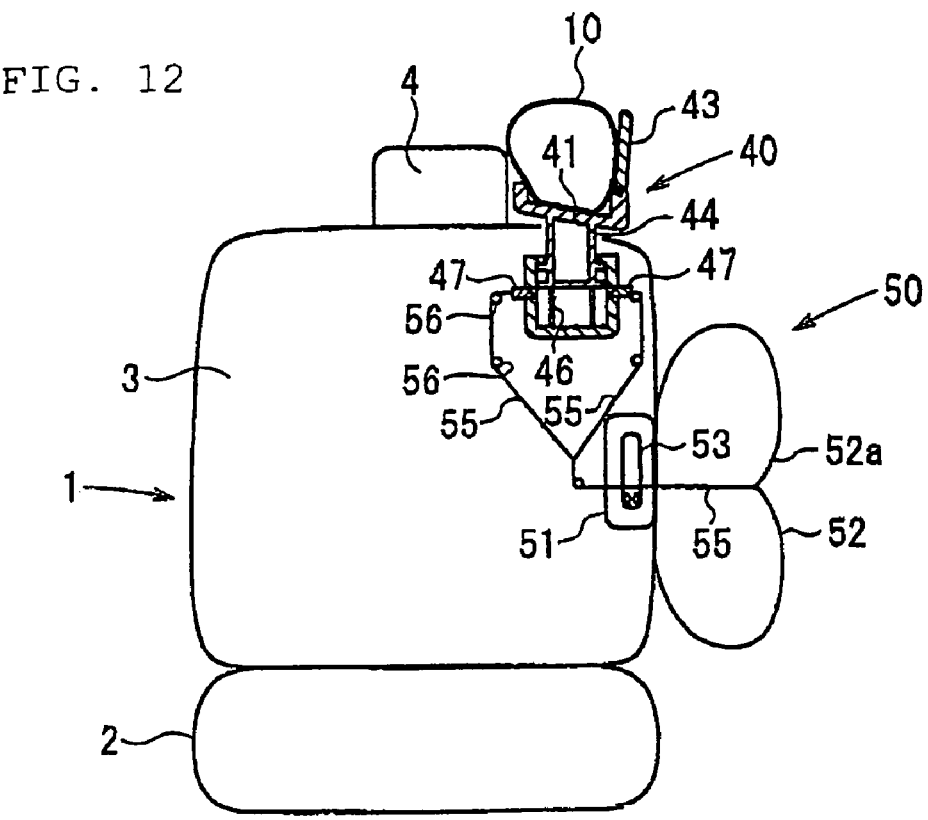
FIG. 12 is a schematic view of a seat provided with the passenger constraining apparatus in FIG. 11.
Figure 13:
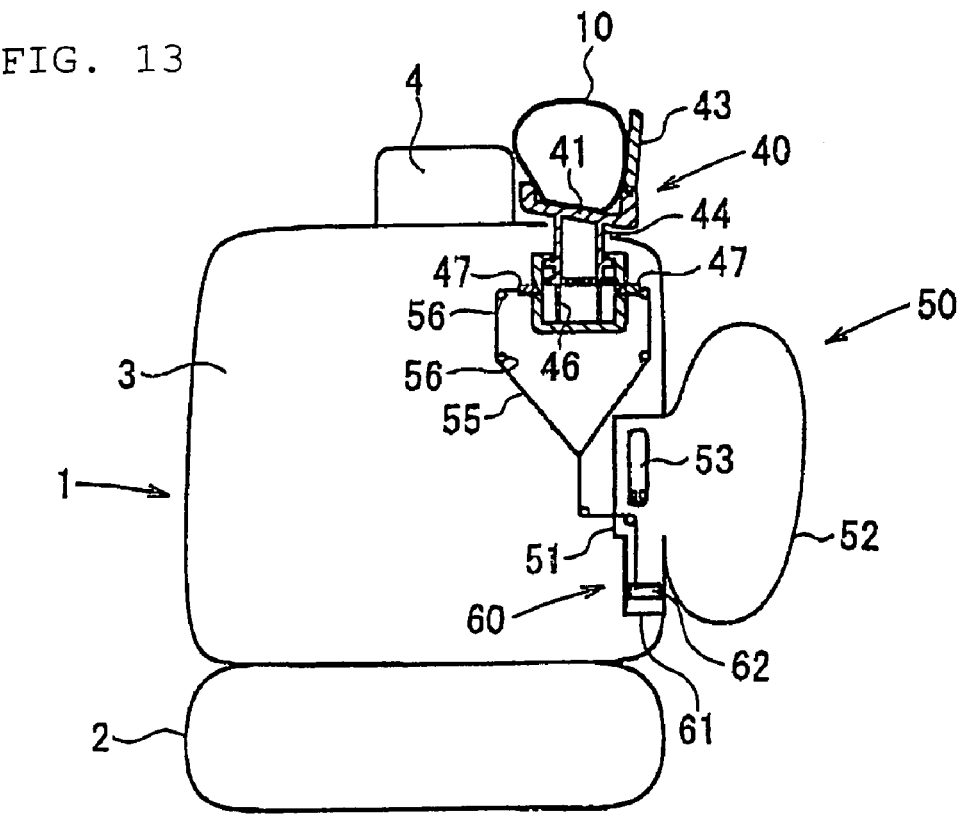
FIG. 13 is a schematic view of another seat provided with the passenger constraining apparatus of FIG. 11.

In the embodiment of FIGS. 10(a) and 10(b), the belt guide 41 and the guiding member 44 are slightly pushed downward by the tensile force of the inflated shoulder belt section 10, whereby the lock pins 47 are retracted. However, as shown in FIG. 11 to FIG. 13, it is also possible to use a side airbag apparatus to release the locking action in the push-up device 40 caused by the lock pins 47. FIG. 11 is a cross-sectional view of a push-up device 40 with a wire and FIG. 12 is a cross-sectional view of a seat. FIG. 13 is a cross-sectional view of the seat in a case in which an actuator is mounted to the side airbag apparatus.

In FIGS. 11 to 12, a side airbag apparatus 50 is installed in the seatback 3. The side airbag apparatus 50 can include a case 51 installed on a side surface portion of the seatback 3, a side airbag 52 stored in the case 51, an inflator 53 for inflating the side airbag 52 toward the lateral side of passenger, and so on.

A distal end side 52a of the side airbag 52 in the inflating direction and the lock pins 47 are connected via a wire 55. Reference numeral 56 designates a jig for guiding the wire 55.

In this passenger constraining apparatus, the shoulder belt section 10 and the side airbag 52 are inflated in case of vehicle side collision. When the inflator 53 is activated and the side airbag 52 is inflated, the wire 55 is pulled by the distal end side 52a of the side airbag 52 in the inflating direction, and the lock pins 47 are retracted. Accordingly, the belt guide 41 and the guiding member 44 rise when the engagement between the lock pin 47 and the lower flange section 44b is released, and the upper flange section 44a comes into abutment with the stopper section 45s. Thus, the shoulder belt section 10 in the inflated state is maintained at a high position.

In FIG. 13, an actuator 60 of a gas cylinder type is provided in the side airbag apparatus 50 for pulling the wire 55 by using the gas pressure generated from the inflator 53. The actuator 60 is connected at one end to the case 51, and includes a cylinder 61 in which gas from the inflator 53 is introduced therein and a piston 62 arranged in the cylinder 61. A distal end of the wire 55 is connected to the piston 62.

When the inflator 53 is activated and generates gas in case of a vehicle side collision, the piston 62 moves downward, the wire 55 is pulled, and the lock pins 47 are retracted. Accordingly, the guiding member 44 and the belt guide 41 are pushed upward by the spring 46.

The above-described embodiments are all shown for illustrative purposes, and the present invention is not limited to the configurations shown in the drawings.

For example, in the above-describe embodiments, the passenger constraining belt is configured in such a manner that only the shoulder belt section 10 is inflated. However, a configuration in which the lap belt section 11 is also inflated is also applicable. The passenger constraining belt may also be configured to be inflated only around the lateral side of the passenger's head. The gas supply system for the inflatable portion, the retracting system for the case in which the belt is not attached, the belt passage structure of the tongue, or the through anchor of the passenger constraining belt may be of configurations other than those shown in the drawings.

Figure 14:
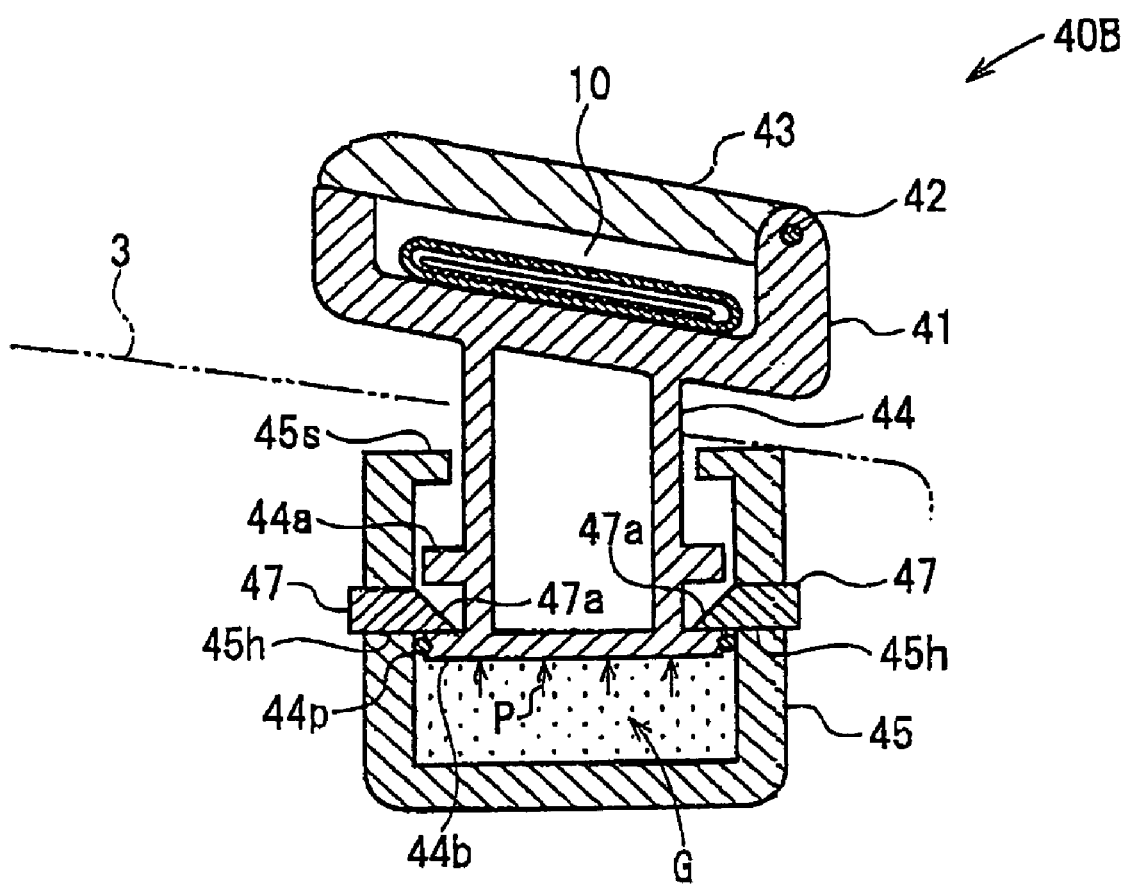
FIG. 14 is a cross-sectional view of the push-up device showing a state before the inflatable portion of the passenger constraining apparatus is pushed up according to another embodiment.
Figure 15:
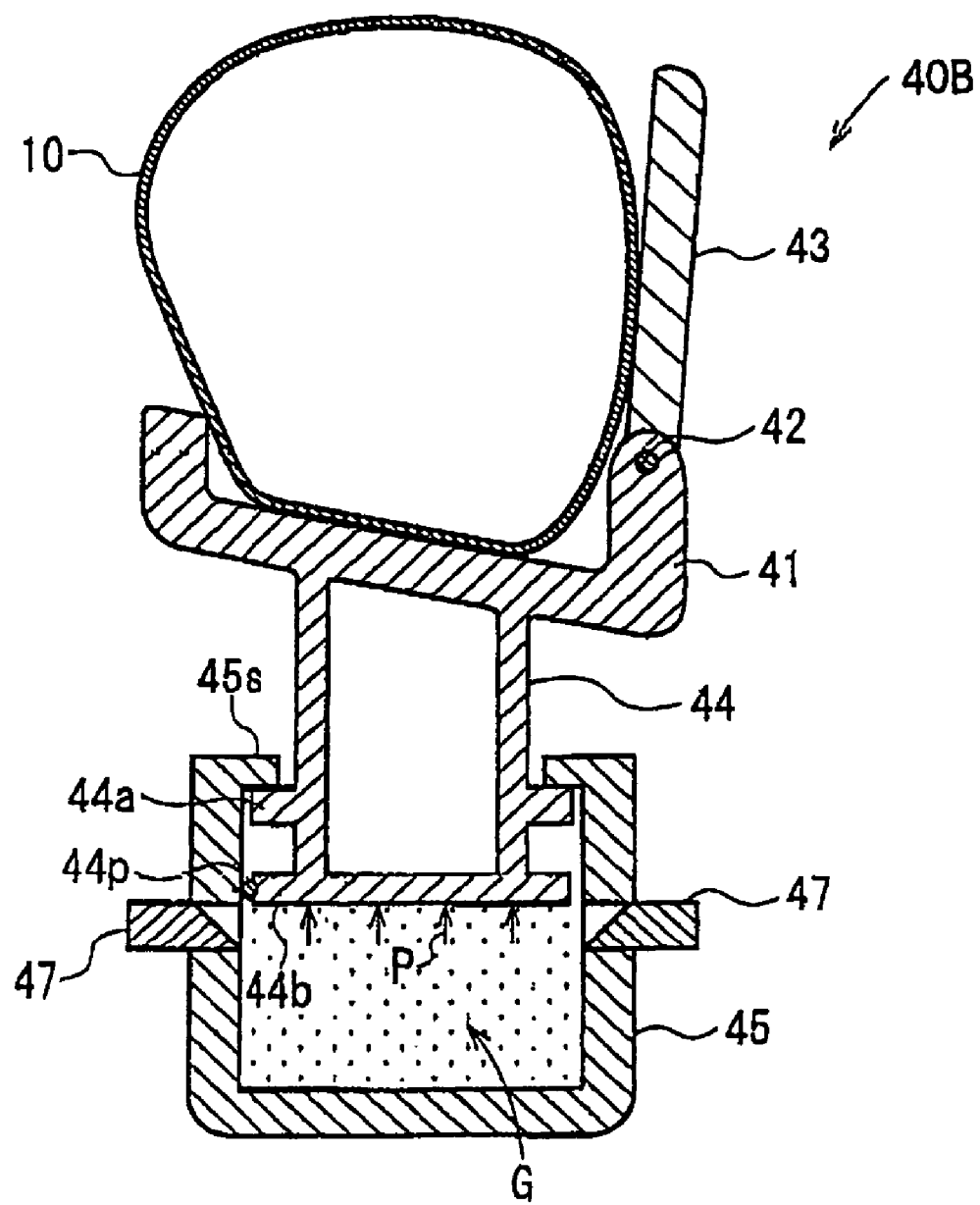
FIG. 15 is a cross-sectional view of the push-up device showing a state when the inflatable portion of the passenger constraining apparatus of FIG. 14 is pushed up.

In FIG. 7 to FIG. 13, the guiding member 44 and the belt guide 41 are pushed up by the spring 46. However, it may alternatively be configured to push up with compressed gas (for example, air). FIG. 14 and FIG. 15 are cross-sectional views showing an example of the push-up device configured in this manner. FIG. 14 shows a state before the push-up device pushes the inflatable portion, and FIG. 15 shows a state when the inflatable portion is pushed up.

A push-up device 40B in this embodiment has a configuration in which compressed gas G is filled in an air chamber instead of interposing the spring 46 between the bottom surface (the lower flange section 44b) of the guiding member 44 and the bottom surface of the holding member 45 (such as the embodiments shown in FIGS. 7 to 9). Reference numeral 44p designates a packing interposed between a side peripheral surface of the lower flange section 44b at a lower end of the guiding member 44 and the inner peripheral surface of the holding member 45. In this embodiment, air is used as compressed gas G. However, gas other than air can be used.

Other aspects of the push-up device 40B are the same as those in the push-up device 40 of FIGS. 7 to 9. The reference numerals in FIG. 14 and FIG. 15 that are the same as those in FIGS. 7 to 9 represent the same parts. An operating state of the push-up device 40B (for example, the lock releasing operation of the lock pins 47) is the same as that in the embodiment shown in FIGS. 7 to 9, and the description will be omitted.

In this push-up device 40B, when the shoulder belt section 10 is inflated and the locking action of the guiding member 44 (i.e., the lower flange section 44b) by the lock pin 47 is released, the guiding member 44 is raised by a pressure P from the compressed gas G in the holding member 45. Thus, the inflated shoulder belt section 10 is pushed upward as shown in FIG. 15.

The compressed gas G may be filled in the holding member 45 in advance. However, alternatively, for example, an inflator (such as a gas generator) can be installed in the holding member 45 so that the inflator is activated to eject gas when the locking action of the lock pins 47 is released, whereby the guiding member 44 is raised by the gas pressure.

The priority applications, Japanese Patent Application No. 2005-278172, filed on Sep. 26, 2005, and Japanese Patent Application No. 2006-050537, filed on Feb. 27, 2006, are incorporated herein by reference in their entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A passenger constraining apparatus comprising:
a passenger constraining belt configured to be pulled around a front side of a passenger and around a lateral side of the head of the passenger located in a vehicle seat having a seatback, wherein the passenger constraining belt comprises an inflatable portion configured such that at least a portion of the inflatable portion is arranged near the lateral side of the head of the passenger; and
a push-up device for pushing up the inflatable portion, wherein the push-up device is configured to be provided on an upper portion of the seatback, wherein the push-up device comprises:
a belt guide in which the inflatable portion is passed through;
a guiding member extending downward from the belt guide and being supported so as to be capable of rising with respect to the seatback;
a rotating member arranged on an upper side of the inflatable portion which is drawn over the belt guide, wherein the rotating member is rotatably attached to the belt guide at a first end side so that a second end side of the rotating member can rotate upward;
a lever section projecting from the first end side of the rotating member, wherein the lever section is configured to move downward when the second end side of the rotating member is rotated upward; and
an abutment member configured to be provided on the upper portion of the seatback so that the lever section comes into abutment with the abutment member when the lever section is rotated.

2. The passenger constraining apparatus according to claim 1, wherein the belt guide is configured to be provided on an upper surface side of the seatback.

3. The passenger constraining apparatus according to claim 2, wherein the belt guide is configured to be raised by the lever section being moved downward when the second end side of the rotating member is rotated upward, and wherein the second end side of the rotating member is caused to rotate upward by an inflating pressure of the inflatable portion.

4. The passenger constraining apparatus according to claim 2, further comprising a downward movement preventing mechanism for preventing a downward movement of the belt guide after the belt guide is raised.

5. The passenger constraining apparatus according to claim 1, wherein the lever section is configured such that the belt guide is configured to be pushed upward if the lever section is further rotated after the lever section comes into abutment with the abutment member.

6. A passenger constraining apparatus comprising:
a passenger constraining belt configured to be pulled around a front side of a passenger and around a lateral side of the head of the passenger located in a vehicle seat having a seatback, wherein the passenger constraining belt comprises an inflatable portion configured such that at least a portion of the inflatable portion is arranged near the lateral side of the head of the passenger; and
a push-up device for pushing up the inflatable portion, wherein the push-up device is configured to be provided on an upper portion of the seatback,
wherein the push-up device comprises a belt guide configured to be provided on an upper surface side of the seatback and a raising device for raising the belt guide,
wherein the raising device comprises:
an urging mechanism for urging the belt guide upward;
a belt guide locking mechanism for preventing the belt guide from rising against an urging force applied by the urging mechanism; and
a lock releasing mechanism for releasing the belt guide locking mechanism such that the belt guide is capable of rising, and
wherein the lock releasing mechanism is configured in such a manner that the passenger constraining belt generates a tensile force by inflation of the inflatable portion, and the tensile force presses and moves the belt guide downward, thereby moving the belt guide locking mechanism into a lock releasing position.

7. A passenger constraining apparatus comprising:
a passenger constraining belt configured to be pulled around a front side of a passenger and around a lateral side of the head of the passenger located in a vehicle seat having a seatback, wherein the passenger constraining belt comprises an inflatable portion configured such that at least a portion of the inflatable portion is arranged near the lateral side of the head of the passenger;
an airbag configured to be provided in the vehicle seat; and a push-up device for pushing up the inflatable portion, wherein the push-up device is configured to be provided on an upper portion of the seatback, wherein the push-up device comprises a belt guide configured to be provided on an upper surface side of the seatback and a raising device for raising the belt guide, wherein the raising device comprises:
- an urging mechanism for urging the belt guide upward;
- a belt guide locking mechanism for preventing the belt guide from rising against an urging force applied by the urging mechanism; and
- a lock releasing mechanism for releasing the belt guide locking mechanism such that the belt guide is capable of rising, wherein the airbag is configured to pull the belt guide locking mechanism into a lock releasing position when the airbag is inflated.

8. A passenger constraining apparatus comprising:

a passenger constraining belt configured to be pulled around a front side of a passenger and around a lateral side of the head of the passenger located in a vehicle seat having a seatback, wherein the passenger constraining belt comprises an inflatable portion configured such that at least a portion of the inflatable portion is arranged near the lateral side of the head of the passenger;

an airbag apparatus configured to be provided in the vehicle seat; and a push-up device for pushing up the inflatable portion, wherein the push-up device is configured to be provided on an upper portion of the seatback, wherein the push-up device comprises a belt guide configured to be provided on an upper surface side of the seatback and a raising device for raising the belt guide, wherein the raising device comprises:
- an urging mechanism for urging the belt guide upward;
- a belt guide locking mechanism for preventing the belt guide from rising against an urging force applied by the urging mechanism; and
- a lock releasing mechanism for releasing the belt guide locking mechanism such that the belt guide is capable of rising, wherein the airbag apparatus comprises an inflator for generating gas, and wherein the lock releasing mechanism is configured to pull the belt guide locking mechanism by gas pressure caused by the inflator such that the lock releasing mechanism is pulled into a lock releasing position.

9. A passenger constraining apparatus comprising:

a passenger constraining belt comprising an inflatable portion configured such that at least a portion of the inflatable portion is arranged near a lateral side of a head of a passenger; and a push-up device for pushing up the inflatable portion, wherein the push-up device is configured to be activated by inflation of the inflatable portion, wherein the push-up device comprises:
- a belt guide;
- a rotating member arranged on an upper side of the inflatable portion and is rotatably attached to the belt guide at a first end side so that a second end side of the rotating member can rotate upward;
- a lever section attached to the first end side of the rotating member; and
- an abutment member configured to abut the lever section upon the inflation of the inflatable portion.

10. The passenger constraining apparatus according to claim 9, the lever section is configured such that the belt guide is configured to be pushed upward if the lever section is further rotated after the lever section comes into abutment with the abutment member during inflation of the inflatable portion.

11. A passenger constraining apparatus comprising:

a passenger constraining belt comprising an inflatable portion configured such that at least a portion of the inflatable portion is arranged near a lateral side of a head of a passenger; and a push-up device for pushing up the inflatable portion, wherein the push-up device is configured to be activated by inflation of the inflatable portion or an airbag, wherein the push-up device comprises:
- a belt guide
- an urging mechanism for urging the belt guide upward;
- a belt guide locking mechanism for preventing the belt guide from rising against an urging force applied by the urging mechanism; and
- a lock releasing mechanism activated by the inflation of the inflatable portion or the airbag for releasing the belt guide locking mechanism such that the belt guide is capable of rising.

12. The passenger constraining apparatus according to claim 11, wherein the lock releasing mechanism is configured to activate upon the inflation of the inflatable portion by having the inflatable portion move the belt guide downward, thereby moving the belt guide locking mechanism into a lock releasing position.

13. The passenger constraining apparatus according to claim 11, wherein the airbag is configured to pull the belt guide locking mechanism into a lock releasing position upon inflation of the airbag.

* * * * *